United States Patent
Cho et al.

(10) Patent No.: US 9,233,361 B2
(45) Date of Patent: Jan. 12, 2016

(54) HYDROGEN SEPARATION MEMBRANE AND DEVICE INCLUDING HYDROGEN SEPARATION MEMBRANE

(71) Applicant: SAMSUNG ELECTRONICS CO., LTD., Suwon-si, Gyeonggi-do (KR)

(72) Inventors: Keun woo Cho, Incheon (KR); Hyeon Cheol Park, Hwaseong-si (KR); Kyoung-Seok Moon, Hwaseong-si (KR); Kwang Hee Kim, Seoul (KR); Jae-Ho Lee, Yongin-si (KR); Eun Seog Cho, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 37 days.

(21) Appl. No.: 14/177,308

(22) Filed: Feb. 11, 2014

(65) Prior Publication Data

US 2014/0308177 A1    Oct. 16, 2014

(30) Foreign Application Priority Data

Apr. 12, 2013   (KR) .................. 10-2013-0040181

(51) Int. Cl.

| | |
|---|---|
| B01D 53/22 | (2006.01) |
| B01D 67/00 | (2006.01) |
| B01J 27/198 | (2006.01) |
| B01J 23/847 | (2006.01) |
| B01D 71/02 | (2006.01) |
| C01B 3/50 | (2006.01) |
| B01J 37/34 | (2006.01) |
| B01J 27/185 | (2006.01) |
| H01M 8/06 | (2006.01) |

(52) U.S. Cl.
CPC ............. *B01J 27/198* (2013.01); *B01D 71/022* (2013.01); *B01J 27/1853* (2013.01); *B01J 37/348* (2013.01); *C01B 3/503* (2013.01); *H01M 8/0687* (2013.01); *B01D 2325/10* (2013.01)

(58) Field of Classification Search
CPC .... B01D 53/22; B01D 53/228; B01D 71/022; B01D 2325/10; B01D 2256/16; C01B 3/503; B01J 27/1853; B01J 27/198; B01J 37/348; H01M 8/0687
USPC .......................................... 95/55, 56; 96/4, 11
See application file for complete search history.

(56) References Cited

U.S. PATENT DOCUMENTS 3,865,891 A * 2/1975 Smirnov et al. ................ 585/629
3,957,534 A * 5/1976 Linkohr et al. ..................... 96/4

(Continued)

FOREIGN PATENT DOCUMENTS

| EP | 2478952 A1 | 7/2012 | |
|---|---|---|---|
| KR | 1020090054875 A | 6/2009 | |
| WO | WO 2012/067505 A2 * | 5/2012 | ............... B01J 21/02 |

OTHER PUBLICATIONS

Arbizzani et al., "Methanol permeability and performance of Nafion-zirconium phosphate composite membranes in active and passive direct methanol fuel cells", Journal of Power Sources, vol. 195, 2010, pp. 7751-7756.

(Continued)

*Primary Examiner* — Jason M Greene
(74) *Attorney, Agent, or Firm* — Cantor Colburn LLP

(57) ABSTRACT

A hydrogen separation membrane including: a metal layer including the at least one Group 5 element; and a transition metal catalyst layer on the metal layer, the transition metal catalyst layer including at least one transition metal and at least one of phosphorus (P) or boron (B).

20 Claims, 9 Drawing Sheets

(56) References Cited

U.S. PATENT DOCUMENTS

| | | | |
|---|---|---|---|
| 6,977,009 B2* | 12/2005 | Pan et al. | 95/55 |
| 7,255,721 B1* | 8/2007 | Sato et al. | 95/56 |
| 2003/0220192 A1* | 11/2003 | Tanev | 502/208 |
| 2004/0129135 A1* | 7/2004 | Roark et al. | 95/55 |
| 2005/0241477 A1* | 11/2005 | Mundschau et al. | 95/56 |
| 2007/0157517 A1* | 7/2007 | Tsay et al. | 48/198.1 |
| 2008/0311014 A1* | 12/2008 | Nakamura et al. | 422/191 |
| 2010/0227232 A1* | 9/2010 | Xiao | 429/420 |
| 2011/0014544 A1 | 1/2011 | Lee et al. | |
| 2011/0104021 A1* | 5/2011 | Curello et al. | 422/240 |
| 2011/0229379 A1* | 9/2011 | Way et al. | 422/211 |

OTHER PUBLICATIONS

Hatlevik et al., "Palladium and palladium alloy membranes for hydrogen separation and production: History, fabrication strategies, and current performance", Separation and Purification Technology, vol. 73, 2010, pp. 59-64.

Kim et al., "Anhydrous proton conductivity of a lamella-structured inorganic-organic zirconium-monododecyl phosphate crystalline hybrid", Journal of Power Sources, vol. 172, pp. 694-697, 2007.

Liu et al., "Thermal stability, hydrogen adsorption and separation performance of Ni-based amorphous alloy membranes", Journal of Membrane Science, vol. 244, 2004, pp. 243-249.

M.D. Dolan, "Non-Pd BCC alloy membranes for industrial hydrogen separation", Journal of Membrane Science, vol. 362, 2010, pp. 12-28.

Nishimura et al., "V—Ni alloy membranes for hydrogen purification", Journal of Alloys and Compounds, 2002, 330-332, pp. 902-906.

Yun et al., "Correlations in palladium membranes for hydrogen separation: A review", Journal of Membrane Science, vol. 375, 2011, pp. 28-45.

* cited by examiner

HYDROGEN SEPARATION MEMBRANE AND DEVICE INCLUDING HYDROGEN SEPARATION MEMBRANE

CROSS-REFERENCE TO RELATED APPLICATION

This application claims priority to and the benefit of Korean Patent Application No. 10-2013-0040181, filed on Apr. 12, 2013, and all the benefits accruing therefrom under 35 U.S.C. §119, the entire content of which is incorporated herein by reference.

BACKGROUND

1. Field

A hydrogen separation membrane and a hydrogen separation device including the hydrogen separation membrane are disclosed.

2. Description of the Related Art

A hydrogen separation membrane selectively separates hydrogen gas from a gas mixture including hydrogen gas, and is applied for producing high purity hydrogen or the like. For example, when methane gas is modified, hydrogen ($H_2$) and carbon dioxide ($CO_2$) gasses are produced. By passing the mixed gas through the hydrogen separation membrane, high purity hydrogen may be obtained since carbon dioxide is not passed through the separation membrane, and only hydrogen gas is passed.

A polymer, a ceramic, a metal, or the like has been developed for a material for a hydrogen separation membrane. Among them, the metal hydrogen separation membrane has high selectivity to hydrogen and thus can provide ultrahigh purity hydrogen. The ultrahigh purity hydrogen separated through the metal hydrogen separation membrane has a merit of being directly applied to a polymer electrolyte fuel cell or the like.

The polymer electrolyte fuel cell uses a platinum catalyst for oxidizing the hydrogen gas into hydrogen ions. As the platinum catalyst is easily poisoned by carbon monoxide (CO), if that occurs, the fuel cell performance is remarkably deteriorated. Accordingly, when using the ultrahigh purity hydrogen produced with the metal hydrogen separation membrane, the platinum catalyst may be prevented from being poisoned by carbon monoxide, and the polymer electrolyte fuel cell may be driven at high efficiency and for a long time.

Since hydrogen may permeate through the metal hydrogen separation membrane by dissociating hydrogen molecules in the inlet surface, diffusing hydrogen atoms in the metal, and recombining hydrogen atoms in the outlet surface, the hydrogen decomposition/recombination catalyst characteristics of the metal separation membrane surface and the inner crystal structure of the metal separation are of interest. Since the high hydrogen permeation characteristics of palladium (Pd) were reported, palladium (Pd)-based hydrogen separation membranes have been much studied (see, for example, S. Yun et al., J. Membr. Sci. 375, 2011, 28-45, the content of which is incorporated herein by reference in its entirety). Nonetheless, there remains a need for an improved hydrogen separation membrane.

SUMMARY

An embodiment provides an economical hydrogen separation membrane having excellent hydrogen permeation characteristics and that is capable of suppressing hydrogen embrittlement fractures.

Another embodiment provides a hydrogen separation device including the hydrogen separation membrane.

According to one embodiment, a hydrogen separation membrane includes a metal layer including at least one Group 5 element; and a transition metal catalyst layer on the metal layer, the transition metal catalyst layer including at least one transition metal and at least one of phosphorus (P), or boron (B).

The at least one transition metal of the transition metal catalyst layer may be one of nickel (Ni), cobalt (Co), titanium (Ti), vanadium (V), chromium (Cr), manganese (Mn), iron (Fe), copper (Cu), zinc (Zn), or an alloy of the foregoing transition metals.

The phosphorus (P) of the transition metal catalyst layer may be included in an amount of less than or equal to about 20 atomic percent (atom %), for example about 1 to about 15 atom %, based on a total content of the transition metal catalyst layer.

The boron (B) of the transition metal catalyst layer may be included in an amount of less than or equal to about 40 atom %, for example about 1 to about 40 atom %, based on a total content of the transition metal catalyst layer.

For example, the transition metal catalyst layer may have a composition represented by the following Chemical Formula 1.

$$A_{1-x-y}P_xB_y \qquad \text{Chemical Formula 1}$$

In Chemical Formula 1,
A is Ni, Co, Fe, Ti, V, Cr, Mn, Cu, Zn, or an alloy thereof,
P is phosphorus,
B is boron (B),
x is a real number of $0 \leq x \leq 0.15$, and
y is a real number of $0 \leq y \leq 0.20$.

The transition metal catalyst layer may be disposed directly on at least one surface of the metal layer including the at least one Group 5 element.

The transition metal catalyst layer may be disposed by electroplating, electroless plating, chemical vapor deposition (CVD), or physical vapor deposition (PVD).

The at least one Group 5 element may be at least one of vanadium (V), niobium (Nb), tantalum (Ta), or an alloy thereof.

The metal layer including the at least one Group 5 element may further include at least one of iron (Fe), aluminum (Al), nickel (Ni), titanium (Ti), tungsten (W), or an alloy thereof, as well as the Group 5 element.

The metal layer including the at least one Group 5 element may have a body-centered cubic (BCC) crystalline structure.

The hydrogen separation membrane may further include a noble metal layer including at least one of platinum (Pt), palladium (Pd), ruthenium (Ru), or an alloy thereof.

The noble metal layer may be disposed directly on a surface of the metal layer including the Group 5 element, or may be disposed directly on a surface of the transition metal catalyst layer.

The hydrogen separation membrane may further include a transition metal layer and exclude phosphorus (P) or boron (B).

The transition metal layer without phosphorus (P) or boron (B) may include at least one transition metal of nickel (Ni), cobalt (Co), titanium (Ti), vanadium (V), chromium (Cr), manganese (Mn), iron (Fe), copper (Cu), zinc (Zn), or an alloy of the foregoing metals.

The transition metal layer without phosphorus (P) or boron (B) may be disposed on a surface of the metal layer including the Group 5 element, or may be disposed on the transition metal catalyst layer.

A total thickness of the hydrogen separation membrane may range from about 1 micrometer (μm) to about 500 μm.

In the hydrogen separation membrane, the transition metal catalyst layer including at least one transition metal and at least one of phosphorus (P) or boron (B) may have a thickness of about 10 nanometers (nm) to about 2000 nm, for example about 50 nm to about 1000 nm. The hydrogen separation membrane may have hydrogen permeability of about $1.0 \times 10^{-9}$ mol/m*s*Pa$^{1/2}$ to about $5 \times 10^{-8}$ mol/m*s*Pa$^{1/2}$ at 400° C.

According to another embodiment, a hydrogen separation device includes: the hydrogen separation membrane.

The hydrogen separation device may further include: a feed gas chamber including an inlet for a mixed gas including hydrogen gas; and a discharge chamber including an outlet for the separated hydrogen gas, wherein a first surface of the hydrogen separation membrane contacts the feed gas chamber, wherein a second surface opposite the first surface of the hydrogen separation membrane contacts the discharge chamber, and wherein the first surface of the hydrogen separation membrane includes the transition metal catalyst layer.

Specifically, the first surface coated with the transition metal catalyst layer including the phosphorus (P), boron (B), or both phosphorus and boron of the hydrogen separation membrane may contact the feed gas chamber, and the second surface may contact the discharge chamber.

In an exemplary embodiment, the hydrogen separation membrane may be formed to have a tubular shape, a cylindrical chamber barrier rib having a diameter larger than a diameter of the tubular hydrogen separation membrane may be disposed on an outer surface of the hydrogen separation membrane, a space between the chamber barrier rib and the hydrogen separation membrane may define a feed gas chamber, and an inner surface of the hydrogen separation membrane may define the discharge chamber for discharging hydrogen.

Also disclosed is a method of manufacturing a hydrogen separation membrane including: providing a metal layer including a Group 5 element; and disposing a transition metal catalyst layer on the metal layer, wherein the transition metal catalyst layer includes at least one transition metal and includes at least one of phosphorous or boron, and wherein the transition metal catalyst layer is disposed by electroplating, electroless plating, chemical vapor deposition, or physical vapor deposition to manufacture the hydrogen separation membrane.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
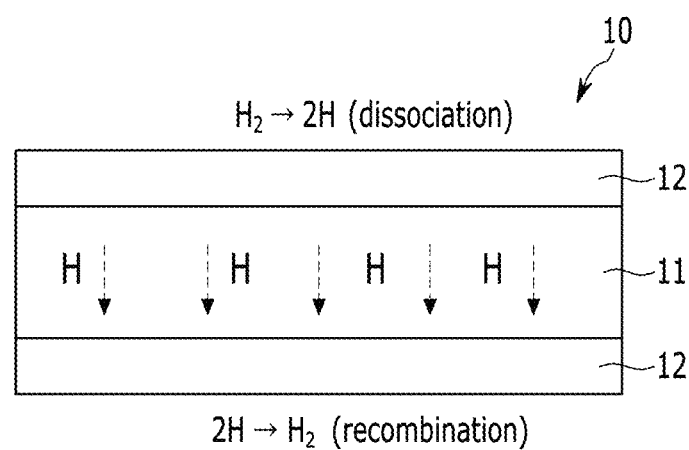
FIG. 1 is a schematic view showing an embodiment of a mechanism in which hydrogen gas is separated through a hydrogen separation membrane.

This disclosure will be described more fully hereinafter in the following detailed description, in which some but not all embodiments of this disclosure are described. However, this disclosure may be embodied in many different forms and is not construed as limited to the exemplary embodiments set forth herein. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise.

"Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 12 of the Periodic Table of the Elements.

As those skilled in the art would realize, the described embodiments may be modified in various different ways, all without departing from the spirit or scope of this disclosure. The size and thickness of each constituent element as shown in the drawings are schematically indicated for better understanding and ease of description, and this disclosure is not limited to that shown.

Because palladium (Pd) alloy hydrogen separation membranes are expensive, for substituting the same, a Group 5-based (for example, vanadium (V), niobium (Nb), tantalum (Ta)) hydrogen separation membrane has been developed. The vanadium (V) separation membrane having a body-centered cubic structure is known for having higher hydrogen permeability than palladium (Pd), which has a face centered cubic structure, however a catalyst layer is coated on the V membrane because the surface of V has little or no hydrogen dissociation/recombination catalyst characteristics. Many have reported the hydrogen permeation of a vanadium (V) alloy separation membrane coated with a palladium (Pd)-based catalyst layer having a thickness of several hundred nanometers according to a sputtering process (see, for example, C. Nishimura et al., J. Alloys Compd. 330-332, 2002, 902-906, the content of which is incorporated herein by reference in its entirety). However, sputtering for providing a catalyst layer is a prolonged and complicated process, and the palladium (Pd)-based catalyst is expensive. Accordingly, for commercializing a Group 5-based hydrogen separation membrane, substitution of the complicated sputtering process and the expensive palladium (Pd)-based catalyst are desired.

According to an embodiment, a hydrogen separation membrane includes a metal layer including at least one Group 5 element, and a transition metal catalyst layer on the metal layer, the transition metal catalyst layer including at least one transition metal and at least one of phosphorus (P), or boron (B).

As the metal for a hydrogen separation membrane which selectively separates only hydrogen from the gas mixture including hydrogen, a palladium (Pd)-based alloy has been widely researched. The palladium (Pd)-based alloy is known for acting as a catalyst in a reaction in which a hydrogen molecule is dissociated into hydrogen atoms from the surface (see, for example, O. Hatlevik et al., J. of Separation and Purification Technology, 73, 59-64, 2010, the content of which is incorporated herein by reference in its entirety). However, the high price of the noble metal, e.g., palladium (Pd), is a limiting factor for commercializing a metal hydrogen separation membrane (in 2013, Pd was $700 per troy ounce). Accordingly, the development of an economical material for a hydrogen separation membrane is needed, and a material using Group 5 elements such as vanadium (V), niobium (Nb), and tantalum (Ta) has been researched as a substitute for the palladium (Pd).

Group 5 elements have a body-centered cubic (BCC) crystalline structure, so Group 5 metals have higher hydrogen permeation performance of about 10 times to about 100 times that of pure palladium (Pd), which has a face centered cubic (FCC) crystalline structure. However, since Group 5 metals have no catalyst characteristics for the reaction of dissociating hydrogen molecules into hydrogen atoms, differing from palladium (Pd), the Group 5 metals may permeate hydrogen by coating palladium (Pd) on the surface thereof at a thickness of several hundred nanometers, causing a cost increase. In addition, if hydrogen is permeated into the palladium (Pd)-coated Group 5-based alloy, the mother alloy has a problem of embrittlement fractures due to the high hydrogen solubility (see, for example, M. D. Dolan, J. Membr. Sci. 362, 2010, 12-28, the content of which is incorporated herein by reference in its entirety).

Accordingly, in an embodiment, a transition metal catalyst layer including phosphorus (P), boron (B), or both is disposed on, e.g., disposed directly on or coated on, the surface of a Group 5 metal, and thereby a hydrogen separation membrane having improved hydrogen permeation performance of the Group 5 element, and suppressing hydrogen embrittlement, may be provided.

Specifically, the hydrogen separation membrane according to the embodiment is a hydrogen separation membrane including a transition metal catalyst layer including at least one transition metal and phosphorus (P), boron (B), or both, which is coated on at least one surface of a metal layer including at least one of vanadium (V), niobium (Nb), tantalum (Ta), or an alloy thereof.

The at least one transition metal of the transition metal catalyst layer may be nickel (Ni), cobalt (Co), titanium (Ti), vanadium (V), chromium (Cr), manganese (Mn), iron (Fe), copper (Cu), zinc (Zn), or an alloy of the foregoing metals. For example, the at least one transition metal of the transition metal catalyst layer may be nickel, cobalt, or an alloy of nickel and cobalt.

The phosphorus (P) of the transition metal catalyst layer may be included in an amount of less than or equal to about 20 atomic percent (atom %), for example about 1 to about 15 atom %, based on a total content of the transition metal catalyst layer.

The boron (B) of the transition metal catalyst layer may be included in an amount of less than or equal to about 40 atom %, for example about 1 to about 20 atom %, based on a total content of the transition metal catalyst layer.

Accordingly, in an exemplary embodiment, the transition metal catalyst layer may have a composition represented by the following Chemical Formula 1.

$$A_{1-x-y}P_xB_y \quad \text{Chemical Formula 1}$$

In Chemical Formula I,
A is Ni, Co, Fe, Ti, V, Cr, Mn, Cu, Zn, or an alloy thereof,
P is a phosphorus (P) element,
B is a boron (B) element,
x is a real number of $0 \leq x \leq 0.15$, and
y is a real number of $0 \leq y \leq 0.20$.

In a method of manufacturing a hydrogen separation membrane, the method may comprise: providing a metal layer comprising a Group 5 element; and disposing a transition metal catalyst layer on the metal layer. The transition metal catalyst layer comprises at least one transition metal and comprises at least one of phosphorous or boron. The transition metal catalyst layer may be formed on at least one surface of the metal layer including the at least one Group 5 element using electroplating, electroless plating, chemical vapor deposition ("CVD"), physical vapor deposition ("PVD"), and the like, but the coating method is not limited thereto.

The at least one Group 5 element may be vanadium (V), niobium (Nb), tantalum (Ta), or an alloy thereof, and may further include iron (Fe), aluminum (Al), nickel (Ni), titanium (Ti), tungsten (W), or an alloy thereof, as well as the Group 5 element.

The metal layer including the at least one Group 5 element may have a body-centered cubic ("BCC") crystalline structure. While not wanting to be bound by theory, it is understood that the metal layer maintains the body-centered cubic crystalline structure, and thereby the hydrogen atoms dissociated by the transition metal layer may be well permeated into the metal layer.

The hydrogen separation membrane may further include a noble metal layer including at least one of platinum (Pt), palladium (Pd), ruthenium (Ru), or an alloy thereof.

The noble metal layer may be disposed on, e.g., disposed directly on, or coated on, a surface of the metal layer including the at least one Group 5 element, or disposed on or disposed directly on the transition metal catalyst layer.

When the noble metal layer is coated on a surface of the metal layer including the at least one Group 5 element, a surface of the hydrogen separation membrane may be comprise the transition metal catalyst layer, and an opposite surface may comprise the noble metal layer.

When the noble metal layer is coated on the surface of the transition metal catalyst layer, the hydrogen atoms rapidly dissociated by the noble metal layer may not permeate directly into the metal layer including the Group 5 element but may permeate by passing through a transition metal catalyst layer including phosphorus (P), boron (B), or phosphorus and boron. Thereby, the metal layer including the Group 5 element may be prevented from having the hydrogen embrittlement fracture caused by the rapid hydrogen atom solubilization.

The hydrogen separation membrane may further include a transition metal layer including at least one transition metal selected from nickel (Ni), cobalt (Co), titanium (Ti), vanadium (V), chromium (Cr), manganese (Mn), iron (Fe), copper (Cu), zinc (Zn), or an alloy thereof, optionally without phosphorus (P) or boron (B).

The transition metal layer may be disposed on, e.g., disposed directly on or coated on, the surface of the metal layer including the at least one Group 5 element, or disposed on or disposed directly on a transition metal catalyst layer including the transition metal and at least one of phosphorus (P) or boron (B).

While not wanting to be bound by theory, it is understood that when the transition metal layer is coated on the surface of the transition metal catalyst layer including at least one of phosphorus (P) or boron (B), the transition metal catalyst layer including at least one of phosphorus (P), or boron (B) may act as a diffusion barrier between the transition metal layer and the metal layer including the Group 5 element to suppress the hydrogen permeability decrease. For example, the hydrogen separation membrane coated with nickel (Ni) on the surface of vanadium (V) loses the catalyst characteristics by the mutual diffusion between vanadium and nickel when permeating hydrogen at a high temperature of greater than or equal to about 400° C., so that the hydrogen permeability rapidly decreases. However, when the hydrogen separation membrane is prepared by forming a nickel (Ni)-phosphorus (P) coating layer on a vanadium surface and coating nickel thereon, the hydrogen separation membrane may have high hydrogen permeability since the nickel-phosphorus coating layer suppresses the mutual diffusion of vanadium and the nickel layer.

A thickness of the hydrogen separation membrane may range from about 1 micrometer (μm) to about 500 μm.

The transition metal catalyst layer may be coated on the surface of the metal layer including the Group 5 element at a thickness of about 10 nanometers (nm) to about 2000 nm, for example about 50 nm to about 1000 nm.

The hydrogen separation membrane may have hydrogen permeability of about $1.0 \times 10^{-9}$ to about $5 \times 10^{-8}$ moles per meters-seconds-Pascals$^2$ (mol/m*s*Pa$^{1/2}$) at 400° C.

In the following example, nickel (Ni) or cobalt (Co) is coated on each surface of the vanadium (V) substrate and measured for hydrogen permeability while maintaining the condition of about 400° C. and hydrogen pressure of about 7 bar for about 2 hours. It is determined that the Ni coated hydrogen separation membrane has hydrogen permeability of about $3.3 \times 10^{-9}$ mol/m*s*Pa$^{1/2}$, and the Co coating the hydrogen separation membrane has hydrogen permeability of less than or equal to about $1 \times 10^{-9}$ mol/m*s*Pa$^{1/2}$. While not wanting to be bound by theory, it is understood that Ni acts as a more effective catalyst for a hydrogen separation membrane than Co.

According to another embodiment, when a nickel (Ni)-phosphorus (P) alloy layer is coated on both surfaces of the vanadium (V) substrate, the hydrogen permeability measured under the conditions of about 400° C. and hydrogen pressure of about 7 bar for about 2 hours is about $1.2 \times 10^{-8}$ mol/m*s*Pa$^{1/2}$ (referring to FIG. 2) when the content of phosphorus (P) is about 10 atom % in the alloy layer. It is understood that the hydrogen permeability is around 75% of the hydrogen permeability of a pure Pd separation membrane, which may be sufficiently usable for a hydrogen separation membrane.

The hydrogen permeability may be calculated according to the following equation.

$$\text{Permeability} = (J \times L)/(\sqrt{P_{H_2,in}} - \sqrt{P_{H_2,out}})  \quad \text{Equation 1}$$

In Equation 1, J is flux, L is a thickness of a separation membrane, $P_{H2,in}$ is a hydrogen feeding pressure, and $P_{H2,out}$ is hydrogen permeation pressure.

Figure 4:
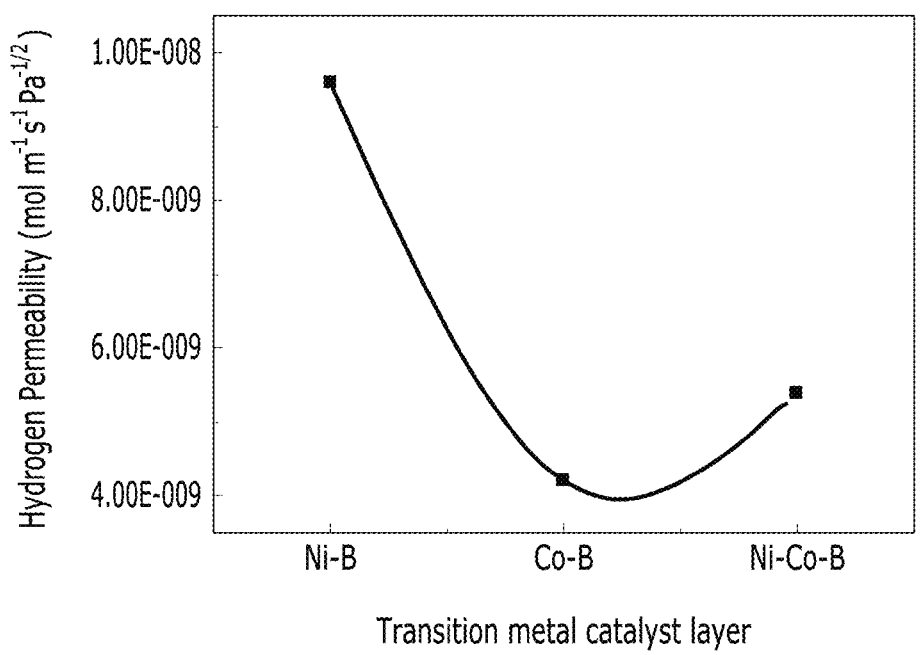
FIG. 4 is a graph of hydrogen permeability (moles per meters-seconds-Pascals$^2$, mol·m$^{-1}$ s$^{-1}$·Pa$^{-1/2}$) versus transition metal catalyst layer type showing hydrogen permeability of a hydrogen separation membrane including a transition metal catalyst layer including a transition metal of nickel (Ni), cobalt (Co), or an alloy of nickel (Ni) and cobalt (Co), each of which is alloyed with boron (B) at about 10 atom %, respectively, on both surfaces of a vanadium (V) substrate.

Furthermore, in another embodiment, when a Ni—B, Co—B, or a Ni—Co—B alloy layer is coated on both surfaces of the V substrate, Ni—B has the highest hydrogen permeability, Co—B has the lowest hydrogen permeability, and Ni—Co—B has hydrogen permeability that is lower than Ni—B and higher than Co—B (referring to FIG. 4).

Figure 6:
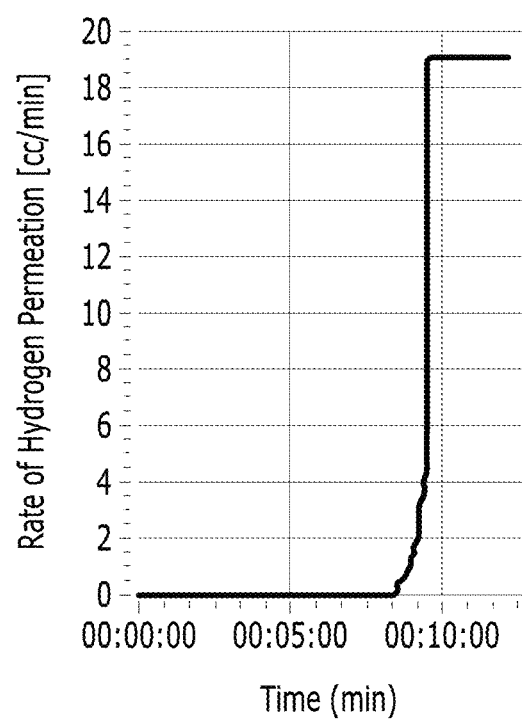
FIG. 6 is a graph of hydrogen permeation rate (cubic centimeters per minute, CC/min) versus time (minutes) showing that a hydrogen permeation rate is suddenly increased by a fracture due to hydrogen embrittlement when hydrogen is injected into a hydrogen separation membrane including a niobium (Nb)-titanium (Ti) alloy coated with palladium (Pd) at about 400° C.

FIG. 6 is a graph showing that the separation membrane is fractured by hydrogen embrittlement while injecting hydrogen toward the hydrogen separation membrane including Nb—Ti coated with Pd at 400° C., so the hydrogen permeation rate is suddenly increased. This means that the conventional Pd-coated hydrogen separation membrane including the Group 5 element is fractured due to hydrogen embrittlement during the driving or cooling, so the hydrogen permeation rate is suddenly increased.

Figure 7:
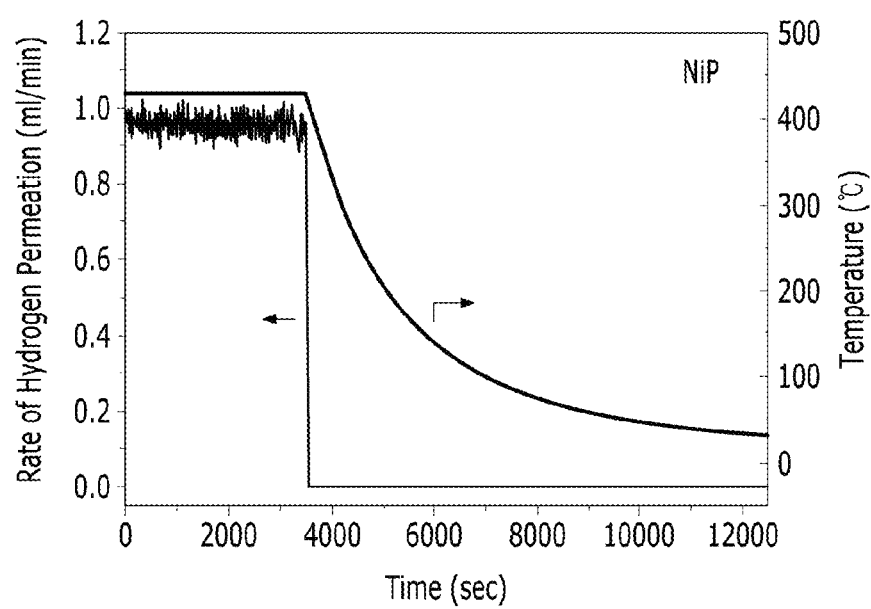
FIG. 7 is a graph of hydrogen permeation rate (milliliters per minute, mL/min) and temperature (° C.) versus time (seconds) showing that the hydrogen embrittlement fracture does not occur as the hydrogen permeation rate is maintained at 0 in a temperature range of less than or equal to about 400° C. when the hydrogen separation membrane coated with nickel (Ni)-phosphorus (P) on the vanadium (V) substrate is maintained under the conditions of about 430° C. and a hydrogen pressure of about 7 bar and is then gradually cooled.

On the other hand, as shown in FIG. 7, when the hydrogen separation membrane in which Ni—P is coated on the V substrate is maintained under the conditions of 430° C. and hydrogen pressure of about 7 bar and is then gradually cooled down, the hydrogen separation membrane maintains a hydrogen permeation rate of 0 during cooling at less than or equal to 400° C., so thereby, it is understood that the hydrogen embrittlement fracture does not occur in the V layer. In other words, compared to the Pd-coated Group 5 element hydrogen separation membrane, the hydrogen embrittlement characteristics are significantly improved, so that driving for a long time is provided.

In addition, when a nickel (Ni)-phosphorus (P) alloy layer is coated on both surfaces of the vanadium (V) substrate, and nickel is additionally coated thereon, the hydrogen permeability measured by maintaining the conditions of 400° C. and the hydrogen pressure of about 7 bar for about 2 hours is about $1.8 \times 10^{-8}$ mol/m*s*Pa$^{1/2}$. It is understood that it is higher than the hydrogen permeability of $1.6 \times 10^{-8}$ mol/m*s*Pa$^{1/2}$ of the pure Pd separation membrane, and thus can provide high purity hydrogen more effectively.

From this, it is understood that the hydrogen separation membrane according to one embodiment is economical because it omits a noble metal layer, such as a Pd layer, and provides an appropriate hydrogen dissociation and permeation property, and does not cause the hydrogen embrittlement fracture due to the high hydrogen solubility of the Group 5 element. Thus it may be useable for separating high purity hydrogen with high efficiency for a long time.

Also, in an embodiment wherein a noble metal layer, such as a Pd layer, is disposed onto a Ni—P alloy layer, the membrane may provide further improved hydrogen permeability, like an embodiment in which nickel (Ni) is disposed onto the nickel (Ni)-phosphorus (P) alloy layer. In other words, the Ni—P alloy layer may act a barrier layer for preventing the mutual diffusion between Pd and the Group 5 element and may provide excellent hydrogen permeability according to the effects on the catalyst layer of Pd.

Accordingly, in another embodiment,
a hydrogen separation device includes:
the hydrogen separation membrane;
a feed gas chamber equipped with an inlet for a mixed gas including hydrogen gas; and
a discharge chamber including an outlet for the separated hydrogen gas,
wherein a first surface of the hydrogen separation membrane contacts the feed gas chamber, wherein a second surface opposite the first surface of the hydrogen separation membrane contacts the discharge chamber, and wherein the first surface of the hydrogen separation membrane comprises the transition metal catalyst layer.

In the hydrogen separation device, a surface coated with the transition metal catalyst layer including at least one of phosphorus (P), or boron (B) contacts the chamber, and the other opposite surface contacts the discharge chamber.

Figure 8:
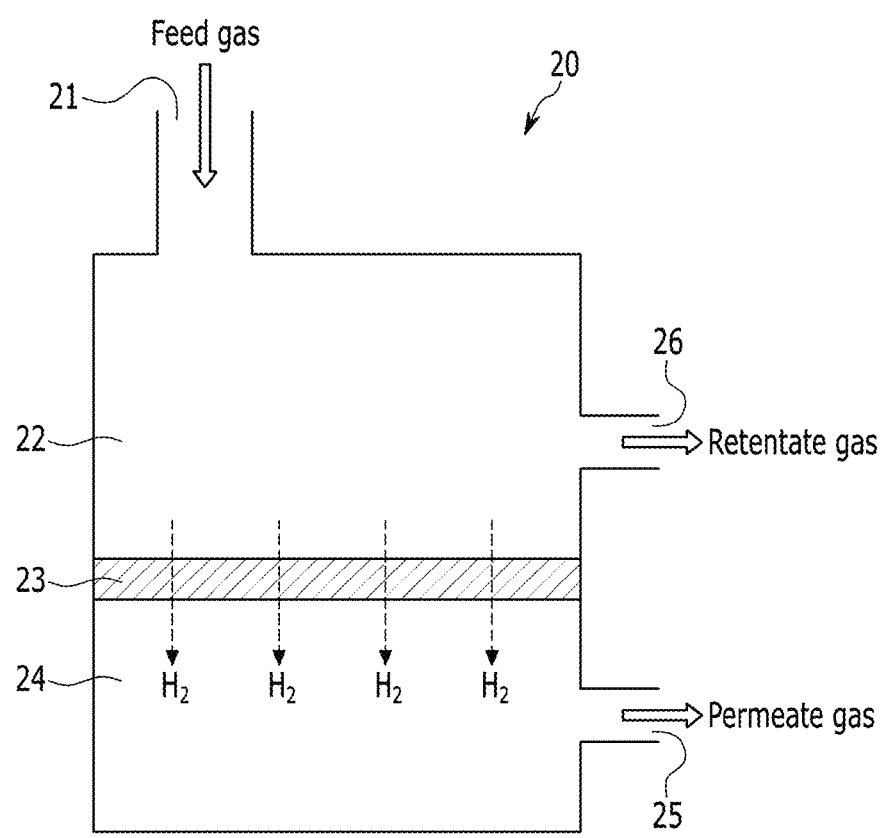
FIG. 8 is a schematic view showing an embodiment of a hydrogen separation device.

FIG. 8 is a schematic view showing a hydrogen separation device 20 according to an embodiment. If a mixed gas including hydrogen gas is introduced into a chamber 22 through an inlet 21, only the hydrogen gas of the mixed gas is selectively separated into a discharge chamber 24 through the hydrogen separation membrane 23. The separated hydrogen gas may be recovered through an outlet 25. The hydrogen separation device 20 may further include a recovery unit 26 for recovering a residual gas in the chamber 22, after the hydrogen is separated from the chamber 22. The hydrogen separation device 20 is shown in a simplified form for better comprehension and ease of description, and may further include additional constitutional components as desired.

According to an embodiment, the hydrogen separation membrane may be formed in a tubular shape and may be formed with a cylindrical chamber barrier rib having a larger diameter than a diameter of the tubular shaped hydrogen separation membrane, which is outside of the hydrogen separation membrane, and wherein the space between the chamber barrier rib and the hydrogen separation membrane defines a feed gas chamber, and wherein the inside of the tubular shaped hydrogen separation membrane may define a permeate chamber for discharging hydrogen.

Figure 9:
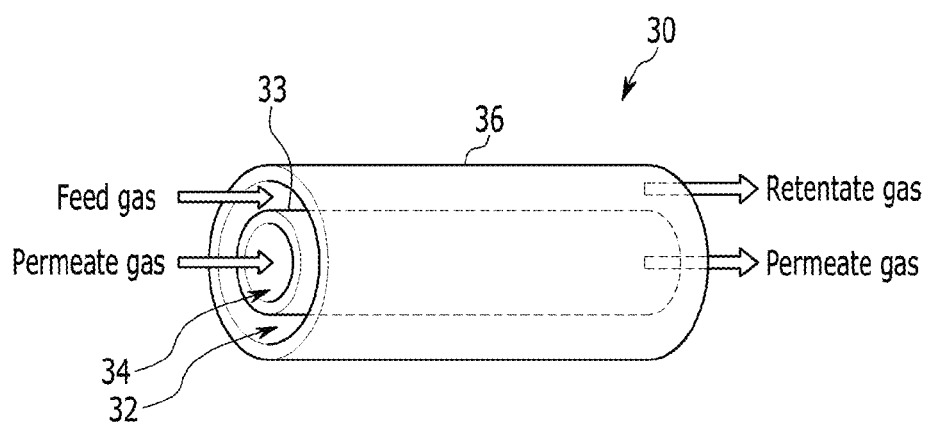
FIG. 9 is a schematic view showing an embodiment of a hydrogen separation device including a tubular separation membrane.

FIG. 9 is a schematic view showing a tubular shaped hydrogen separation device 30 according to another embodiment. The hydrogen separation device 30 may include a tubular shaped hydrogen separation membrane 33, and a cylindrical chamber barrier rib 36 with a larger diameter than that of the tubular shaped hydrogen separation membrane and which is disposed outside of the hydrogen separation membrane 33. In this case, a space between the chamber barrier rib 36 and the hydrogen separation membrane 33 may be a feed gas chamber 32, and a discharge chamber 34 for discharging hydrogen is formed inside the tubular shaped hydrogen separation membrane. The chamber 32 may be equipped with an inlet (not shown) of a mixed gas including hydrogen gas, and a recovery unit (not shown) for recovering residual gas after the hydrogen gas is separated. Further, the discharge chamber 34 may be equipped with an outlet (not shown) for the separated hydrogen gas.

Even in the tubular-shaped hydrogen separation device, the transition metal catalyst layer including at least one of phosphorus or boron of the hydrogen separation membrane may be disposed to contact the feed gas chamber.

Hereinafter, an embodiment is illustrated in more detail with reference to examples. However, they are exemplary examples, and this disclosure is not limited thereto.

EXAMPLES

Reference Example 1

Manufacture of Hydrogen Separation Membrane Coated with Ni or Co Layer and Measurement of Hydrogen Permeability A Ni plating solution is a mixed solution of 35 grams per liter (g/L) $NiSO_4.6H_2O$, 5 g/L $NiCl_2.6H_2O$, and 5 g/L $H_3BO_3$, and a Co plating solution is a mixed solution of 45 g/L $CoSO_4.7H_2O$, 60 g/L $C_6H_5Na_3O_7.2H_2O$, and 65 g/L $(NH_4)_2SO_4$. A reduction current density of 0.01 milliamperes per square centimeter ($mA/cm^2$) is applied at room temperature to provide a hydrogen separation membrane coated with a Ni layer or a Co layer on both surfaces of a vanadium (V) substrate having a thickness of 250 micrometers (μm).

A hydrogen permeation test is performed by setting an exposed area of the separation membrane at the hydrogen inlet and outlet to 0.23 square centimeters ($cm^2$), and maintaining a pressure difference between the hydrogen inlet part and outlet part at 7 bar and a temperature at 400° C. for 2 hours.

The hydrogen permeability of the Ni-coated hydrogen separation membrane is about $3.3 \times 10^{-9}$ $mol/m*s*Pa^{1/2}$, and the hydrogen permeability of the Co-coated hydrogen separation membrane is less than or equal to about $1 \times 10^{-9}$ $mol/m*s*Pa^{1/2}$. From these results, it is understood that Ni acts more effectively as a catalyst for a hydrogen separation membrane than Co.

Example 1

Manufacture of Ni—P Alloy Layer-Coated Hydrogen Separation Membrane and Measurement of Hydrogen Permeability A reduction current density of 0.01 $mA/cm^2$ is applied to each of the mixed solutions of 35 g/L $NiSO_4.6H_2O$, 5 g/L $NiCl_2.6H_2O$, 5 g/L $H_3BO_3$, and 0 g/L $NaH_2PO_2.H_2O$, 1 g/L $NaH_2PO_2.H_2O$, 10 g/L $NaH_2PO_2.H_2O$, 100 g/L $NaH_2PO_2.H_2O$, and 300 g/L $NaH_2PO_2.H_2O$, respectively, at room temperature to provide Ni—P plating layers each including 0-20 atom % (i.e., 0 atom %, about 6.8 atom %, about 9.8 atom %, and about 14.3 atom %) of phosphorus (P), based on a total content of the Ni—P transition metal catalyst layer, to both surfaces of a vanadium (V) substrate having a thickness of 250 μm.

Figure 2:
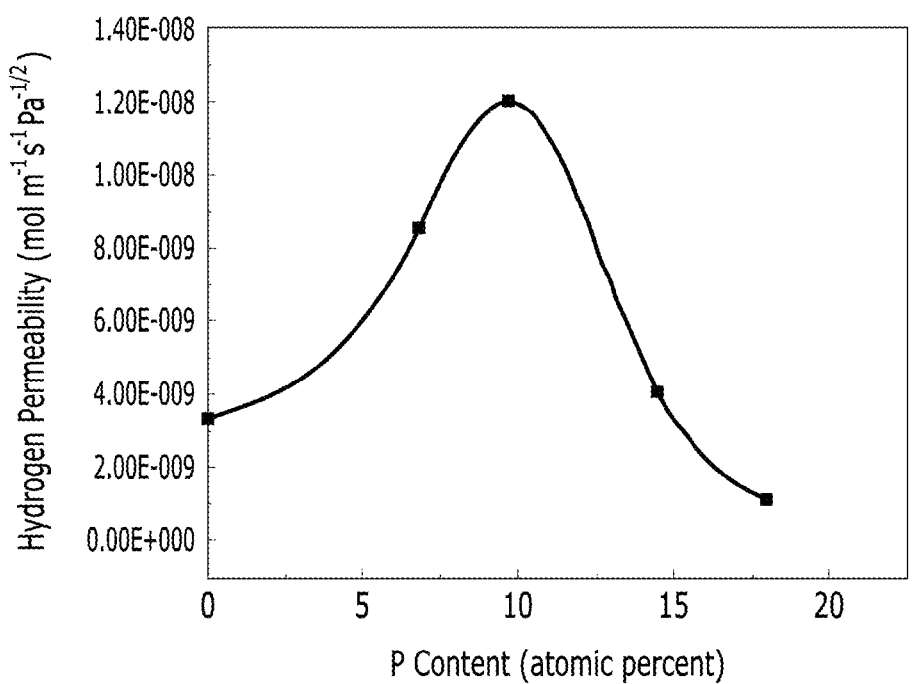
FIG. 2 is a graph of hydrogen permeability (moles per meters-seconds-Pascals$^2$, mol·m$^{-1}$ s$^{-1}$·Pa$^{-1/2}$) versus P content (atomic percent, atom %) showing hydrogen permeability according to the content of phosphorus (P) in a hydrogen separation membrane in which a nickel (Ni)-phosphorus (P) alloy layer is coated on both surfaces of a vanadium (V) substrate.

The hydrogen separation membrane formed with the Ni—P plating layer is measured for hydrogen permeability, and the results are shown in FIG. 2 as a graph according to the content of phosphorus (P).

A hydrogen permeation test is performed by setting an exposed area of the separation membrane at the hydrogen inlet and outlet to 0.23 $cm^2$, and maintaining a pressure difference between the hydrogen inlet part and outlet part at 7 bar and a temperature at 400° C. for 2 hours.

As shown in FIG. 2, the hydrogen permeability is gradually increased according to an increase in the content of P in the Ni plating layer. The hydrogen permeability of V plated with the Ni—P catalyst layer including about 9.8 atom % of P, based on a total content of the Ni—P transition metal catalyst layer, is measured at about $1.2 \times 10^{-8}$ $mol/m*s*Pa^{1/2}$, so it is understood that the hydrogen permeation is about 75% level of a Pd separation membrane which has a permeation of $1.6 \times 10^{-8}$ $mol/m*s*Pa^{1/2}$. In addition, the hydrogen separation membrane is economically feasible compared to the separation membrane coated with Pd. However, it is understood that from the point when the concentration of P in the plating layer is greater than about 9.8 atom %, the hydrogen permeation performance is slightly decreased; and when the concentration of P is increased to greater than or equal to about 15 atom %, the hydrogen permeation performance is remarkably decreased.

Figure 3:
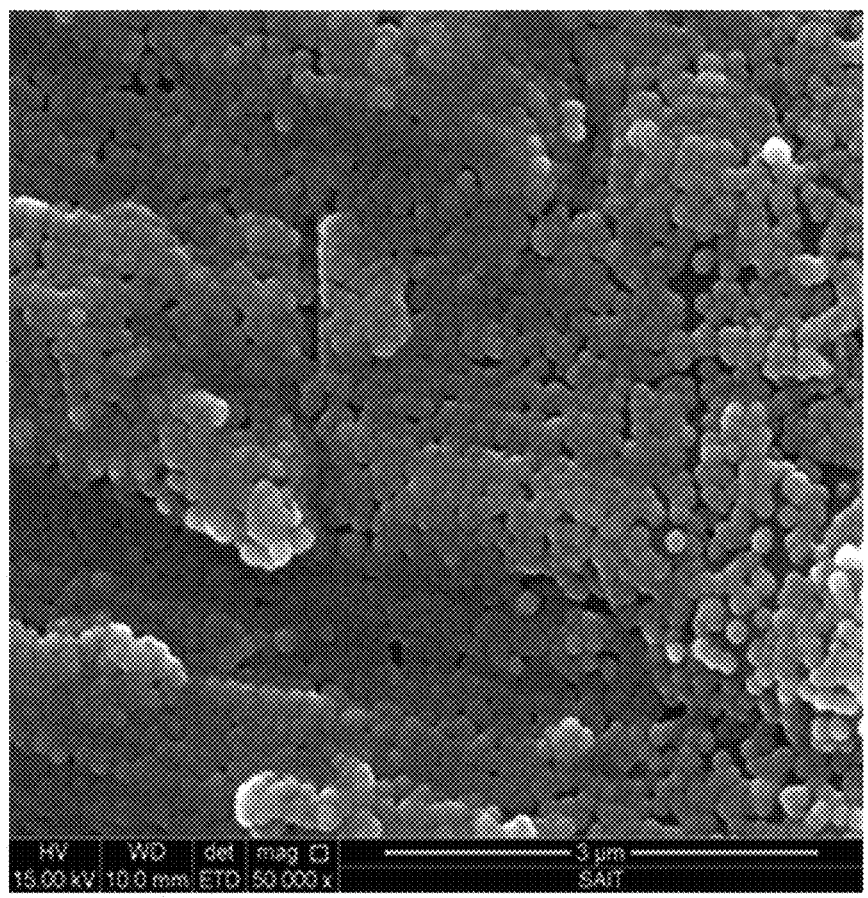
FIG. 3 is an scanning electron microscope ("SEM") photograph showing surface morphology of a nickel (Ni)-phosphorus (P) plating layer when nickel (Ni)-phosphorus (P) is electroplated on a vanadium (V) substrate.

The surface morphology of the V substrate is measured by SEM after applying a reduction current density of 0.01 $mA/cm^2$ in the mixed solution of 35 g/L $NiSO_4.6H_2O$, 5 g/L $NiCl_2.6H_2O$, 5 g/L $H_3BO_3$, and 35 g/L $NaH_2PO_2.H_2O$ at room temperature for 20 seconds, and the results are shown in FIG. 3. As shown in FIG. 3, it is understood that Ni—P particles having a size of several tens of nanometers are bound to each other and almost completely cover the V surface.

Example 2

Manufacture of Hydrogen Separation Membrane Coated with Transition Metal-Boron (B) Alloy Layer and Measurement of Hydrogen Permeability When Ni—B, Co—B, or Ni—Co—B is plated on both surfaces of a V substrate having a thickness of 250 μm, respectively, by electroless plating, a change of hydrogen permeability is observed according to the kind of plating layer.

As a precursor, a 40 wt % $NiCl_2.6H_2O$, 40 wt % $CoCl_2.6H_2O$, and 20 wt % $NiCl_2.6H_2O+20$ wt % $CoCl_2.6H_2O$ solution are used for plating Ni—B, Co—B, and Ni—Co—B, respectively. As a reducing agent, 10 wt % $NaBH_4+1$ wt % NaOH solution is used.

After immersing the V substrate in a precursor solution at room temperature for 5-10 seconds, it is immersed in a reducing agent solution for 5-10 seconds, which are repeated 5-10 times to select the plating amount, so as to provide a hydrogen separation membrane.

The obtained hydrogen separation membrane is maintained under the conditions that the exposed area of the hydrogen inlet and outlet is set 0.23 $cm^2$, respectively, and the pressure difference between the hydrogen inlet part and the outlet part is maintained at 7 bar for 2 hours to measure hydrogen permeability, and the results are shown in FIG. 4.

As shown in FIG. 4, it is understood that the hydrogen permeation characteristics are remarkably increased in the case that Ni—B is plated on the V substrate compared to the Co—B plated case. When Ni—Co—B is plated on the V surface, the hydrogen permeability is increased more than Co—B plated case but less than the Ni—B case. The hydrogen permeability of V plated with the Ni—B catalyst layer is measured to be about $9.6 \times 10^{-9}$ $mol/m*s*Pa^{1/2}$, which is high hydrogen permeability performance at a level of about 60% of the Pd separation membrane which has a permeability of $1.6 \times 10^{-8}$ $mol/m*s*Pa^{1/2}$ and is economically feasible compared to Pd.

Figure 5:
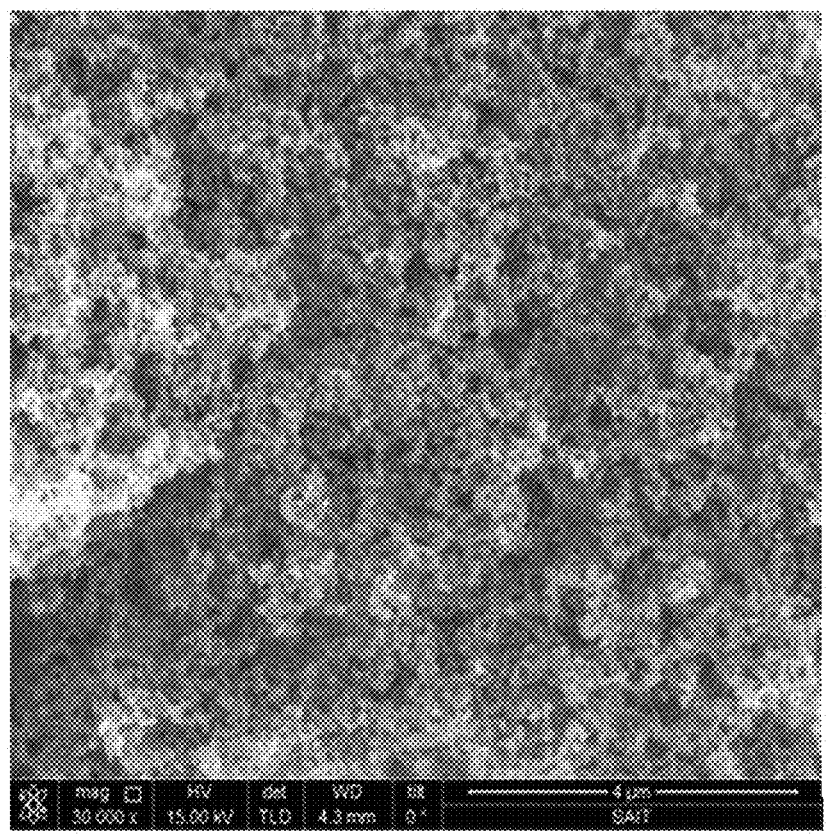
FIG. 5 is a scanning electron microscope photograph showing surface morphology of a nickel (Ni)-boron (B) plating layer when a nickel (Ni)-boron (B) alloy layer is electroless plated on a vanadium (V) substrate.

On the other hand, by using a precursor of a 40 wt % $NiCl_2.6H_2O$ solution and a reducing agent of a 10 wt % $NaBH_4+1$ wt % NaOH solution, the V substrate is electroless plated with Ni—B, and then the surface morphology of the V substrate is measured by SEM, the results of which are shown in FIG. 5. It is understood that Ni—B particles have a nanoporous structure and are bound to each other.

Example 3

Manufacture of Hydrogen Separation Membrane Double Coated with Transition Metal Layer and Transition Metal-Phosphorus (P) Alloy Layer, and Measurement of Hydrogen Permeability A reduction current density of 0.01 mA/cm² is applied to a mixed solution of 35 g/L NiSO$_4$.6H$_2$O, 5 g/L NiCl$_2$.6H$_2$O, 5 g/L H$_3$BO$_3$, and 10 g/L NaH$_2$PO$_2$.H$_2$O at room temperature to provide a Ni—P plating layer on both surfaces of a vanadium (V) substrate having a thickness of 250 μm. Then a reduction current density of 0.01 mA/cm² is applied to a mixed solution of 35 g/L NiSO$_4$.6H$_2$O, 5 g/L NiCl$_2$.6H$_2$O, and 5 g/L H$_3$BO$_3$ at room temperature to provide a Ni plating layer on the Ni—P plating layer.

A hydrogen permeation test is performed by setting an exposed area of the separation membrane at the hydrogen inlet and outlet to 0.23 cm², and a pressure difference between the hydrogen inlet part and outlet part at 7 bar and a temperature at 400° C. is maintained for 2 hours.

The Ni-coated hydrogen separation membrane has a hydrogen permeability of about $3.3 \times 10^{-9}$ mol/m*s*Pa$^{1/2}$ and the Ni—P coated hydrogen separation membrane has a hydrogen permeability of about $1.2 \times 10^{-8}$ mol/m*s*Pa$^{1/2}$, and the Ni/Ni—P double-coated hydrogen separation membrane has a hydrogen permeability of $1.8 \times 10^{-8}$ mol/m*s*Pa$^{1/2}$, which is the highest. From these results, and while not wanting to be bound by theory, it is estimated that in the case of a hydrogen separation membrane coated with nickel (Ni) on the surface of vanadium (V), when hydrogen is permeated through the same at a high temperature of greater than or equal to 400° C., the crystallinity characteristics are lost by mutual diffusion between vanadium and nickel to remarkably decrease the hydrogen permeability. Also, in the hydrogen separation membrane with a nickel (Ni)-phosphorus (P) coating layer formed on the vanadium surface, and with nickel coated thereon, the nickel-phosphorus (P) coating layer suppresses the mutual diffusion between the vanadium and the nickel layer to increase the hydrogen permeability.

Experimental Example 1

Hydrogen Embrittlement Fracture Test

According to the same procedure as in Example 1, the Ni—P plating layer including 10 atom % of P, based on a total content of the transition metal catalyst layer, is coated on both surfaces of a V substrate having a thickness of 250 μm, and the hydrogen permeability performance and the hydrogen embrittlement fracture are observed. The test is performed by constantly maintaining the exposed area of the separation membrane at the hydrogen inlet and outlet at 0.23 cm² and maintaining a pressure difference of hydrogen between the inlet part and the outlet part at 7 bar and at 400° C.

As shown in FIG. 7, it is understood that when the hydrogen pressure is maintained as above, the hydrogen permeation speed at the hydrogen outlet is maintained at about 0.97 mL/min. After that, the hydrogen permeation speed is remarkably decreased and is maintained at 0 when the temperature in the reactor is further cooled to room temperature.

On the other hand, as shown in FIG. 6, it is understood that the hydrogen embrittlement fracture occurs while injecting hydrogen in the Pd-coated Nb—Ti separation membrane, and resultantly the hydrogen permeation speed is remarkably increased due to leakage.

From the results, it is understood that the hydrogen embrittlement fracture of the Ni—P-coated V does not occur since the hydrogen permeation rate is maintained at 0 while cooling down to room temperature.

As described above, the hydrogen separation membrane according to an embodiment provides effective hydrogen separation effects without using the expensive Pd-based/noble metal layer, and the hydrogen embrittlement of the V element is prevented by using the Group 5 metal layer together with a transition metal catalyst layer including at least one transition metal and phosphorus (P), boron (B), or both, to provide a hydrogen separation membrane showing a high hydrogen permeation rate with high purity for a long time.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydrogen separation membrane, comprising:
   a metal layer comprising at least one Group 5 element; and
   a transition metal catalyst layer on the metal layer, the transition metal catalyst layer comprising at least one transition metal and phosphorus (P) in an amount of less than or equal to about 20 atomic percent, based on a total content of the transition metal catalyst layer.

2. The hydrogen separation membrane of claim 1, wherein the at least one transition metal of the transition metal catalyst layer is at least one of nickel (Ni), cobalt (Co), titanium (Ti), vanadium (V), chromium (Cr), manganese (Mn), iron (Fe), copper (Cu), zinc (Zn), or an alloy of the foregoing transition metals.

3. The hydrogen separation membrane of claim 2, wherein the at least one transition metal is at least one of nickel (Ni), cobalt (Co), iron (Fe), copper (Cu), or an alloy of the foregoing transition metals.

4. The hydrogen separation membrane of claim 1, wherein the phosphorus (P) of the transition metal catalyst layer is included in an amount of about 1 atomic percent to about 15 atomic percent, based on a total content of the transition metal catalyst layer.

5. The hydrogen separation membrane of claim 1, wherein the transition metal catalyst layer further comprises boron (B), and wherein the boron (B) is included in an amount of less than or equal to about 40 atomic percent, based on a total content of the transition metal catalyst layer.

6. The hydrogen separation membrane of claim 5, wherein the boron (B) of the transition metal catalyst layer is included in an amount of about 1 atomic percent to about 20 atomic percent, based on a total content of the transition metal catalyst layer.

7. The hydrogen separation membrane of claim 1, wherein the transition metal catalyst layer has a composition represented by Chemical Formula 1:

$$A_{1-x-y}P_xB_y \qquad \text{Chemical Formula 1}$$

wherein, in Chemical Formula 1,
A is Ni, Co, Fe, Ti, V, Cr, Mn, Cu, Zn, or an alloy thereof,
P is phosphorus,
B is boron,
x is a real number of $0 < x \leq 0.15$, and
y is a real number of $0 \leq y \leq 0.20$.

8. The hydrogen separation membrane of claim 1, wherein the transition metal catalyst layer is disposed on at least one surface of the metal layer including the at least one Group 5 element.

9. The hydrogen separation membrane of claim 1, wherein the at least one Group 5 element is at least one of vanadium (V), niobium (Nb), tantalum (Ta), or an alloy thereof.

10. The hydrogen separation membrane of claim 1, wherein the metal layer including the at least one Group 5 element further comprises at least one of iron (Fe), aluminum (Al), nickel (Ni), titanium (Ti), tungsten (W), or an alloy thereof.

11. The hydrogen separation membrane of claim 1, wherein the metal layer including the at least one Group 5 element has a body-centered cubic crystal structure.

12. The hydrogen separation membrane of claim 1, wherein the hydrogen separation membrane further comprises a noble metal layer comprising at least one of platinum (Pt), palladium (Pd), ruthenium (Ru), or an alloy thereof on the metal layer.

13. The hydrogen separation membrane of claim 12, wherein the noble metal layer is disposed directly on a surface of the metal layer including the Group 5 element, or is disposed directly on a surface of the transition metal catalyst layer.

14. The hydrogen separation membrane of claim 1, wherein the hydrogen separation membrane further comprises a transition metal layer comprising at least one of nickel (Ni), cobalt (Co), titanium (Ti), vanadium (V), chromium (Cr), manganese (Mn), iron (Fe), copper (Cu), zinc (Zn), or an alloy thereof and excluding phosphorus (P) or boron (B) on the metal layer.

15. The hydrogen separation membrane of claim 14, wherein the transition metal layer is disposed directly on a surface of the metal layer including the at least one Group 5 element, or is disposed directly on a surface of the transition metal catalyst layer.

16. A hydrogen separation device comprising the hydrogen separation membrane according to claim 1.

17. The hydrogen separation device of claim 16, wherein the hydrogen separation device further comprises:

a feed gas chamber comprising an inlet for a mixed gas including hydrogen gas; and
a discharge chamber including an outlet for a separated hydrogen gas,
wherein a first surface of the hydrogen separation membrane contacts the feed gas chamber,
wherein a second surface opposite the first surface of the hydrogen separation membrane contacts the discharge chamber, and
wherein the first surface of the hydrogen separation membrane comprises the transition metal catalyst layer.

18. The hydrogen separation device of claim 17, wherein the hydrogen separation membrane has a tubular shape,
a cylindrical chamber barrier rib having a diameter which is larger than a diameter of the hydrogen separation membrane is disposed on an outer surface of the hydrogen separation membrane,
a space between the chamber barrier rib and the hydrogen separation membrane defines a feed gas chamber, and
an inner surface of the hydrogen separation membrane defines the discharge chamber for discharging hydrogen.

19. A method of manufacturing a hydrogen separation membrane comprising:
providing a metal layer comprising a Group 5 element; and
disposing a transition metal catalyst layer on the metal layer,
wherein the transition metal catalyst layer comprises at least one transition metal and and phosphorus (P) in an amount of less than or equal to about 20 atomic percent, based on a total content of the transition metal catalyst layer, and
wherein the transition metal catalyst layer is disposed by electroplating, electroless plating, chemical vapor deposition, or physical vapor deposition to manufacture the hydrogen separation membrane.

20. The hydrogen separation membrane of claim 1, wherein the at least one transition metal of the transition metal catalyst layer is at least one of nickel (Ni) and cobalt (Co).

* * * * *